Aug. 4, 1925.
G. D. MUENCH
1,548,275
CORN PLANTER ATTACHMENT
Filed Aug. 11, 1923
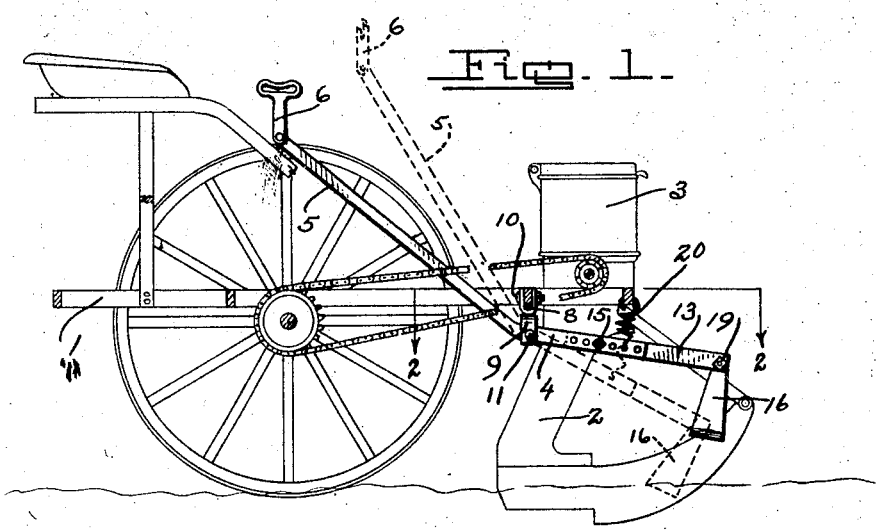
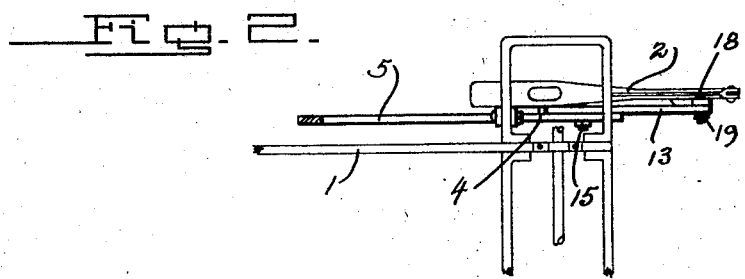
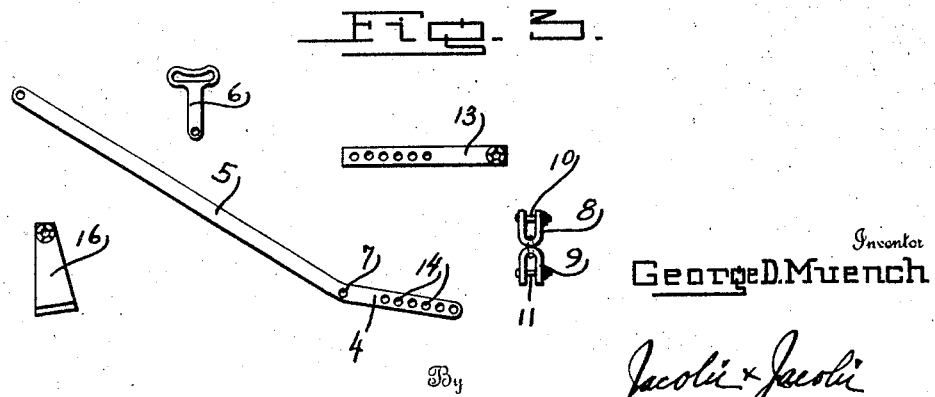
Inventor
George D. Muench
By Jacobi & Jacobi
Attorneys Patented Aug. 4, 1925.

1,548,275

UNITED STATES PATENT OFFICE.

GEORGE D. MUENCH, OF OGDEN, IOWA.

CORN-PLANTER ATTACHMENT.

Application filed August 11, 1923. Serial No. 656,818.

*To all whom it may concern:*

Be it known that GEORGE D. MUENCH, a citizen of the United States, residing at Ogden, in the county of Boone and State of Iowa, has invented certain new and useful Improvements in Corn-Planter Attachments, of which the following is a specification.

This invention relates to new and useful improvements in corn planters and has for its principal object to provide an attachment which is adapted to remove the trash which collects on the runners of the corn planter when the same is in operation.

Another important object of the invention is to provide a corn planter of the above mentioned character, wherein the means is associated with the runners of the corn planter whereby the runners are kept free of any foreign substance upon the manual actuation by the operator of the corn planter or the means and thereby enabling the corn planter to operate in the proper manner.

Another important object of the invention is to provide a corn planter attachment of the above mentioned character, which may be easily and quickly operated and furthermore is of such a construction as to enable the same to be used on various sizes of corn planters.

A still further object of the invention is to provide a corn planter attachment of the above mentioned character, which may be so arranged on the corn planter as not to interfere with the operation thereof but at the same time insure the runners against collecting and carrying trash while the corn planter is in operation.

A further object of the invention is to provide a corn planter attachment of the above mentioned character, which is simple in construction, inexpensive, strong, durable and, further, well adapted for the purposes for which it is designated.

Other objects and advantages of this invention will become apparent during the course of the following description.

In the accompanying drawings forming a part of this specification and in which like numerals designate like parts throughout the same:—

Figure 1 is a longitudinal section through a corn planter showing my attachment in position thereon.

Figure 2 is a section taken on line 2—2 of Fig. 1.

Figure 3 is a detail view of my attachment showing the parts in their disassembled relation.

In the drawings wherein for the purpose of illustration is shown the preferred embodiment of my invention, the numeral 1 designates generally a corn planter which may be of the well known type and which is provided with the usual runners 2 and the seed dropping mechanism including the seed box which is designated at 3. As the construction of the corn planter does not form any important feature of the present invention it is not thought necessary to further go into detail as to the construction of the various parts thereof except in so far as to show the relative arrangement of the several parts of the corn planter in connection with my attachment therefor.

As is often found with the corn planters now in use, in planting seeds, the runners travel over the ground which is full of trash such as growing weeds and stumps and the runners sometimes become clogged with the trash and thereby causes the corn planter to often go out of its line of travel or out of the row in which it is desired to plant the seeds, the trash being such as to prevent the runners from properly functioning. In order to overcome this improper guiding of the runners when the corn planter is in use, I have provided at attachment therefor, which is easily and efficiently operated, for removing the trash from the runners of the corn planter.

My attachment comprises a means which is associated on the frame of the corn planter in close proxmity to the seed box 3 thereon and is adapted to come into engagement with the runners upon manual actuation of the same. As the attachment is adapted to be associated with each runner of the corn planter on the inner face thereof and as the construction of each attachment is the same, it is thought only necessary to describe one in order to suffice for the description of both and the operation of one is also the equivalent of the operation of the other.

A lever 4 is provided with an elongated off set portion 5 which terminates into a suitable handle 6 and this lever 4 is pivotally supported at the offset portion 7 on the frame 1 by means of a coupling designated by the numeral 8. This coupling 8 comprises a pair of U-shaped members 8 and 9 respectively which have their crown portions interlinked and the U-shaped member 8 is adapted to be secured to the frame 1 by means of a bolt 10 while the U-shaped member 9 is adapted to be associated with the offset portion 7 of the lever 4 by means of the bolts 11.

The forward end of the lever 4 is provided with a series of spaced apertures and the purpose of this construction is to permit the lever 13 which is also provided with a series of spaced apertures 14 in its rear end to be adjustably associated with the forward end of the lever 4 and held in such a position by means of the locking bolt 15. The forward end of the lever 13 is associated with the cutter blade or scraper blade 16.

This scraper blade 16 is substantially rectangular in design and can be adjustably supported on the forward end of the lever 13 by providing corrugations around the apertures provided in the upper end of the scraper blade whereby the same is connected to the lever 13. The forward end of the lever 13 is also provided with corrugations on its inner face to cooperate with the corrugations on the scraper blade whereby the bolt 18 and nut 19 associated therewith will hold the scraper blade in its proper adjusted position on the lever 13. It being understood that the corrugated faces of the blade and lever may be moved in either direction and will at all times coact with one another.

For the purpose of normally holding the scraper blade 16 in an inoperative position, I provide a suitable coil spring 20 which is connected at one end to the lever 4 and to the frame 1 at its other end. As will be further seen from Fig. 1 of the drawings, the offset portion 5 of the lever 4 extends rearwardly from the runners and the handle 6 is within reach of the operator of the corn planter seated thereon in the usual manner, and as the corn planter is in operation, and the runners become clogged with trash, the operator merely grasps the handle 6 and by pulling upwardly thereon causes the scraper blade to be moved downward against the inner face of the runners 2 against the tension of the spring 20 and thereby causing the trash to move from the runner and not into the path of the bottom edge of the runner whereby the trash will be entirely removed from the runner and will permit the proper operation of the corn planter and the proper dropping of the seeds in the furrow.

The position of the scraper blade 16 when the same is removing trash from the runners is illustrated in the dotted lines in Fig. 1 of the drawings and it will be seen upon releasing the handle 6, the coil spring 20 will return the levers 4 and 13 and the scraper blade 16 carried by the latter lever to be returned to their normal inoperative position.

The simplicity of my attachment enables the same to be readily placed in position upon a corn planter without interfering with the operation of the remaining parts thereof and furthermore will at all times clean the runners of all foreign substance by simply actuating the levers which are within easy reach of the operator of the corn planter.

From the foregoing description of the construction of my improved apparatus, it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

In a corn planter, the combination including runners; of a lever provided with an elongated offset portion terminating in a handle, said lever being pivotally supported on the frame of said corn planter by a coupling comprising a pair of interlinked U-shaped members, the lower member carrying a pivot bolt, a second lever having a series of apertures for adjustably supporting the forward end of said first mentioned lever, a scraper blade adjustably mounted on the forward end of said second mentioned lever, said scraper blade adapted to be brought into engagement with said runners upon actuation of said handle, and a coil spring for returning said levers and scraper blade to their normal inoperative position.

In testimony whereof I affix my signature.

GEORGE D. MUENCH.